(12) United States Patent
Patrick et al.

(10) Patent No.: US 10,969,006 B2
(45) Date of Patent: Apr. 6, 2021

(54) ELECTRO-MECHANICAL TRANSMISSION SHIFTER

(71) Applicants: ZOOMLION Heavy Industry NA, Inc., Yorkville, WI (US); ZOOMLION Heavy Industry Science and Technology Co. Ltd., Changsha Hunan Province (CN)

(72) Inventors: Shawn Patrick, Yorkville, WI (US); John Virag, Yorkville, WI (US)

(73) Assignees: ZOOMLION HEAVY INDUSTRY NA, INC., Yorkville, WI (US); ZOOMLION HEAVY INDUSTRY SCIENCE AND TECHNOLOGY CO, LTD, Changhua (CN)

( * ) Notice: Subject to any disclaimer, the term of this patent is extended or adjusted under 35 U.S.C. 154(b) by 168 days.

(21) Appl. No.: 16/515,297

(22) Filed: Jul. 18, 2019

(65) Prior Publication Data

US 2021/0018091 A1  Jan. 21, 2021

(51) Int. Cl.
| | | |
|---|---|---|
| *B60W 30/19* | (2012.01) | |
| *F16H 61/04* | (2006.01) | |
| *F16H 61/28* | (2006.01) | |
| *F16H 48/38* | (2012.01) | |
| *F16H 61/34* | (2006.01) | |
| *B60W 30/02* | (2012.01) | |

(52) U.S. Cl.
CPC ....... *F16H 61/0437* (2013.01); *B60W 30/025* (2013.01); *B60W 30/19* (2013.01); *F16H 48/38* (2013.01); *F16H 61/28* (2013.01); *F16H 2061/0422* (2013.01)

(58) Field of Classification Search
CPC ...... F16H 61/0437; F16H 61/28; F16H 61/34; F16H 2061/0422; F16H 48/38; B60W 30/025; B60W 30/19
See application file for complete search history.

(56) References Cited

U.S. PATENT DOCUMENTS 4,002,105 A  *  1/1977  Bell ..................... F16H 61/30
                                              92/62
4,483,211 A  *  11/1984  Hurlow ............... B62D 33/073
                                              74/473.15
4,712,640 A      12/1987  Leigh-Monstevens et al.
(Continued)

*Primary Examiner* — Tisha D Lewis
(74) *Attorney, Agent, or Firm* — Donald J. Ersler

(57) ABSTRACT

An electro-mechanical transmission shifter preferably includes a first actuator, a second actuator, a shift linkage device, actuator mounting bracket, a programmable controller and a gear shift remote. The shift linkage device includes a mounting base plate, a first transmission shifting bracket, a second transmission shifting bracket and a linkage rod. The linkage rod couples the first and second transmission shifting brackets. The actuation rods of the first and second actuators are pivotally connected to the first and second transmission shifting brackets, respectively. A mounting end of the first and second actuators are retained on the actuator mounting bracket with first and second clevis blocks. The programmable controller receives a signal from a gear selector remote to change a gear in a transmission. The programmable controller also monitors the electrical current sent to the first and second actuators.

20 Claims, 5 Drawing Sheets

(56) References Cited

U.S. PATENT DOCUMENTS

| | | | | |
|---|---|---|---|---|
| 5,144,854 A | * | 9/1992 | Herzog | F16H 61/18 |
| | | | | 74/473.15 |
| 5,927,151 A | * | 7/1999 | Alber | F16C 11/0619 |
| | | | | 74/473.3 |
| 7,350,432 B2 | * | 4/2008 | Somschor | F16H 61/32 |
| | | | | 74/335 |
| 9,683,643 B2 | | 6/2017 | Cyren et al. | |
| 2020/0271223 A1 | * | 8/2020 | Rake | F16H 63/3466 |

* cited by examiner

ELECTRO-MECHANICAL TRANSMISSION SHIFTER

BACKGROUND OF THE INVENTION

1. Field of the Invention

The present invention relates generally to heavy equipment and more specifically to an electro-mechanical transmission shifter, which utilizes two electro-mechanical actuators to reduce the amount of discomfort experienced by an operator when shifting a heavy equipment transmission.

2. Discussion of the Prior Art

The state of the art is a Bowden cable mechanism for shifting a transmission from one range of power shift gears to another range of power shift gears. U.S. Pat. No. 4,712,640 to Leigh-Monstevens et al. discloses a hydraulic remote control for motor vehicle manual shift transmission. U.S. Pat. No. 9,683,643 to Cyren et al. discloses a linear actuator assembly having a magnetic sensor.

Accordingly, there is a clearly felt need in the art for an electro-mechanical transmission shifter, which utilizes two electro-mechanical actuators to reduce the amount of discomfort experienced by an operator when shifting a heavy equipment transmission, and monitors electrical current supplied to the two actuators to determine if too much or too little current is required to operate the two actuators to detect premature failure in the transmission or the electric-mechanical linkage.

SUMMARY OF THE INVENTION

The present invention provides an electro-mechanical transmission shifter, which includes a current sensing device for measuring electrical current to the two actuators to detect a premature failure of a heavy equipment transmission. The electro-mechanical transmission shifter (electro-mechanical shifter) preferably includes a first actuator, a second actuator, a shift linkage device, actuator mounting bracket, a programmable controller and a gear shift remote. The shift linkage device includes a mounting base plate, a first transmission shifting bracket, a second transmission shifting bracket and a linkage rod. The mounting base plate includes a top member and a side member that extends downward from an end of the top member. The side member is attached to a transmission housing, adjacent a gear shift output shaft. The first transmission shifting bracket includes a top shift member and a side shift member. The side shift member extends downward from the top shift member. A shaft boss extends inward from the side shift member. A shaft opening is formed through the shaft boss to receive the gear shift output shaft. A shift plate extends upward from one end of the top member.

A male member of a first spherical rod end is threaded into the shift plate. A female member of the first spherical rod end is secured to an actuation end of the first actuator. A male member of a second spherical rod end is secured to an opposing end of the top member. A female member of the second spherical rod end is threaded on to one end of the linkage rod. The second transmission shifting bracket includes a base, an actuator leg and a linkage leg. The actuator leg extends outward from the base and the linkage leg extends outward from the base, substantially perpendicular to the actuator leg. A male member of a third spherical rod end is threaded into the linkage leg. A female member of the second spherical rod end is threaded onto one end of the linkage rod and a female of the third spherical rod end is threaded on to an opposing end of the linkage rod. A male member of a fourth spherical rod end is threaded into the actuator leg of the second transmission shifting bracket. A female member of the fourth spherical rod end is secured to an actuation end of the second actuator.

The actuator mounting bracket is attached to the transmission housing. A first mount end of the first actuator is mounted to the actuator mounting bracket with a first clevis block. A second mount end of the second actuator is mounted to the actuator mounting bracket with a second clevis block. The programmable controller includes a gear shift program and a current monitoring program. The programmable controller receives input from the gear shift remote and the current monitoring device. An operator chooses a transmission gear and the gear shift program moves the drive shafts of the first and second actuators to move the transmission into the selected gear. The current monitor program monitors the amount of current required to cause the first and second actuators to operate the shift linkage device. If the current exceeds pre-determined limits, the programmable controller will send an alert to a display operating screen of the heavy equipment. If too much or too little current is required to operate the first and second actuators, there could be a problem with gears in the transmission or in the shift linkage device.

Accordingly, it is an object of the present invention to provide an electro-mechanical transmission shifter, which utilizes two electro-mechanical actuators to reduce the amount of discomfort experienced by an operator when shifting a heavy equipment transmission.

Finally, it is another object of the present invention to provide an electro-mechanical transmission shifter, which monitors electrical current supplied to the two actuators to detect premature failure in the transmission or the electric-mechanical linkage.

These and additional objects, advantages, features and benefits of the present invention will become apparent from the following specification.

DETAILED DESCRIPTION OF THE PREFERRED EMBODIMENTS

Figure 1:
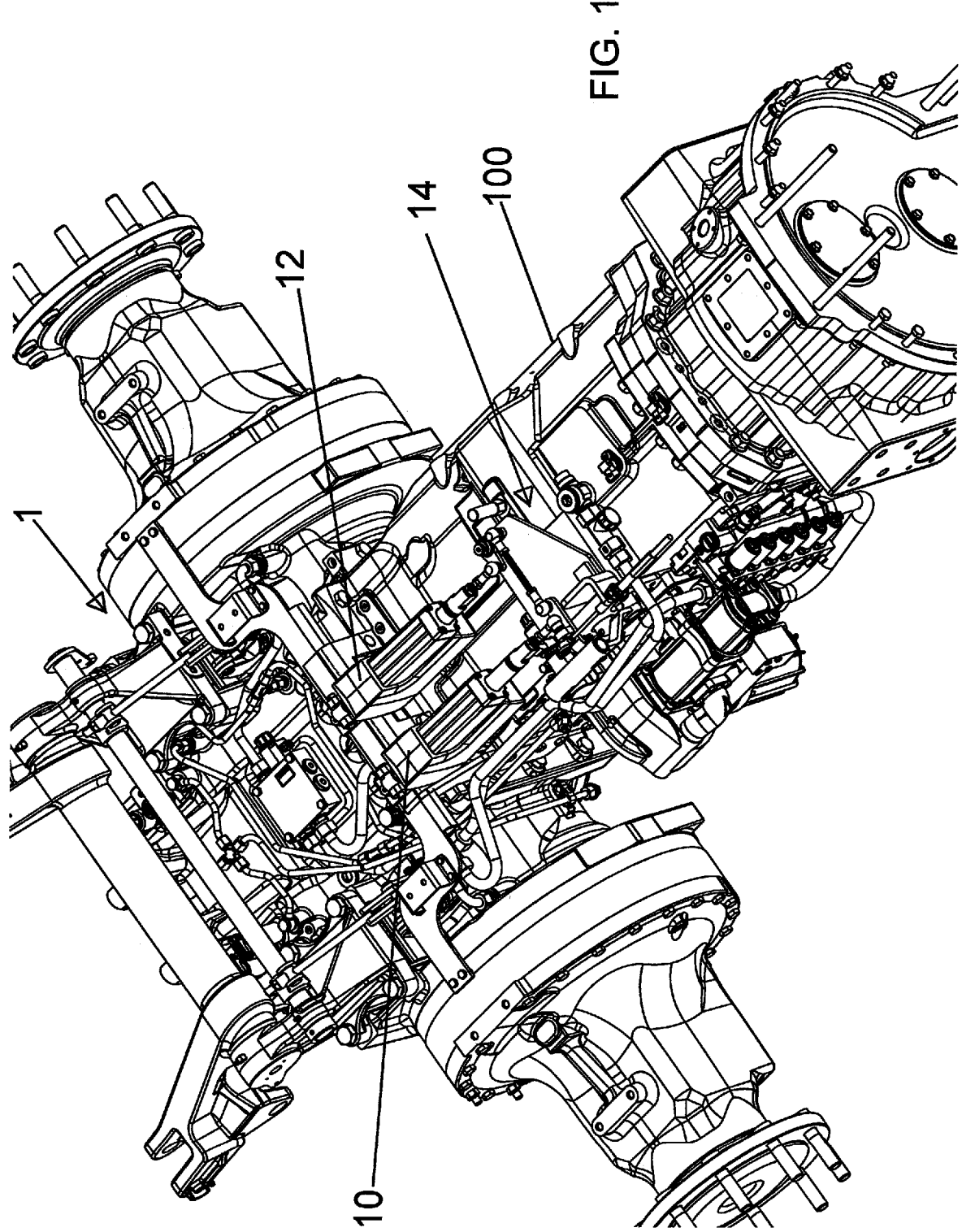
FIG. 1 is a top perspective view of an electro-mechanical shifter retained on a heavy equipment transmission in accordance with the present invention.
Figure 2:
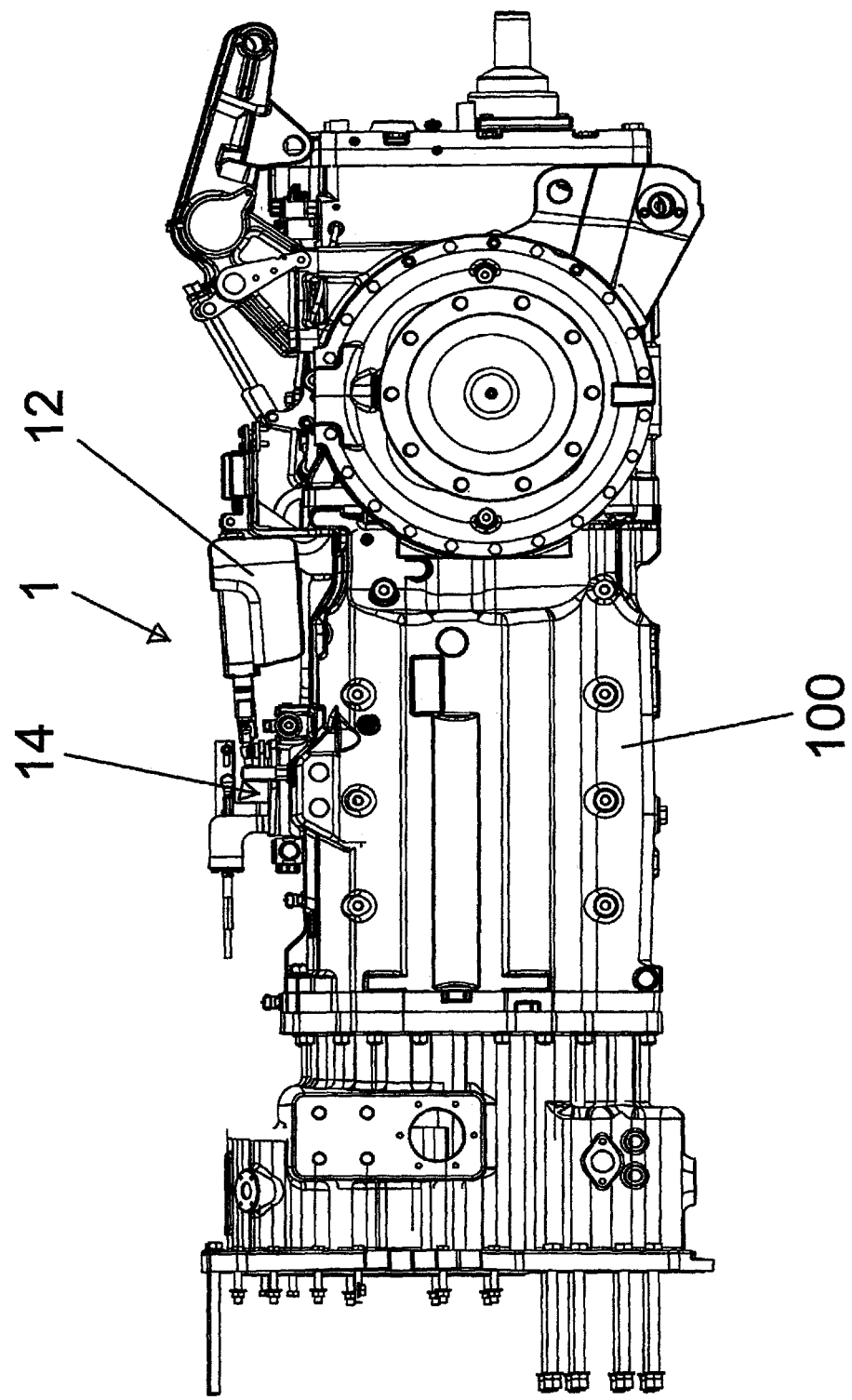
FIG. 2 is a side view of an electro-mechanical shifter retained on a heavy equipment transmission in accordance with the present invention.
Figure 3:
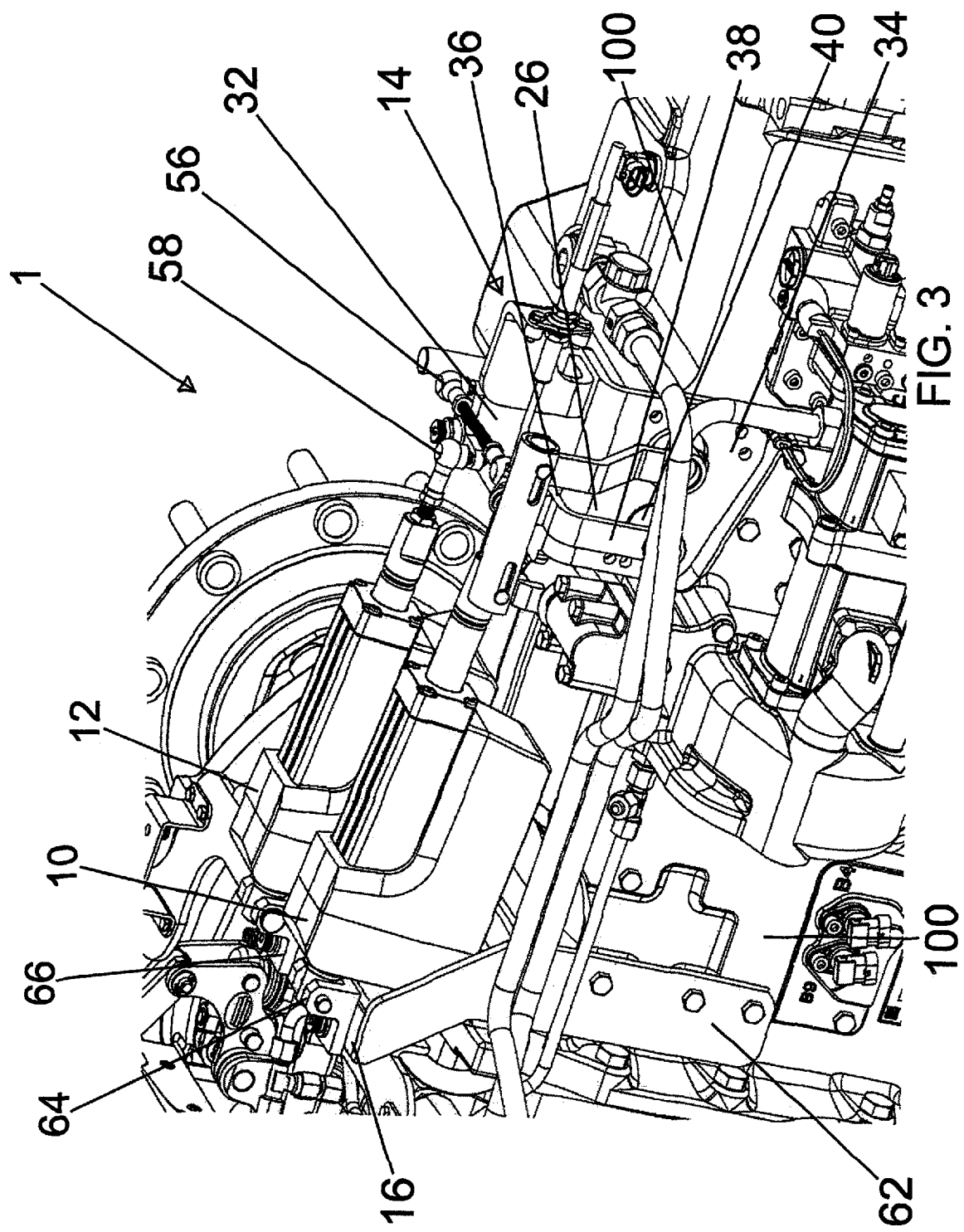
FIG. 3 is a left side perspective view of an electro-mechanical shifter retained on a heavy equipment transmission in accordance with the present invention.
Figure 4:
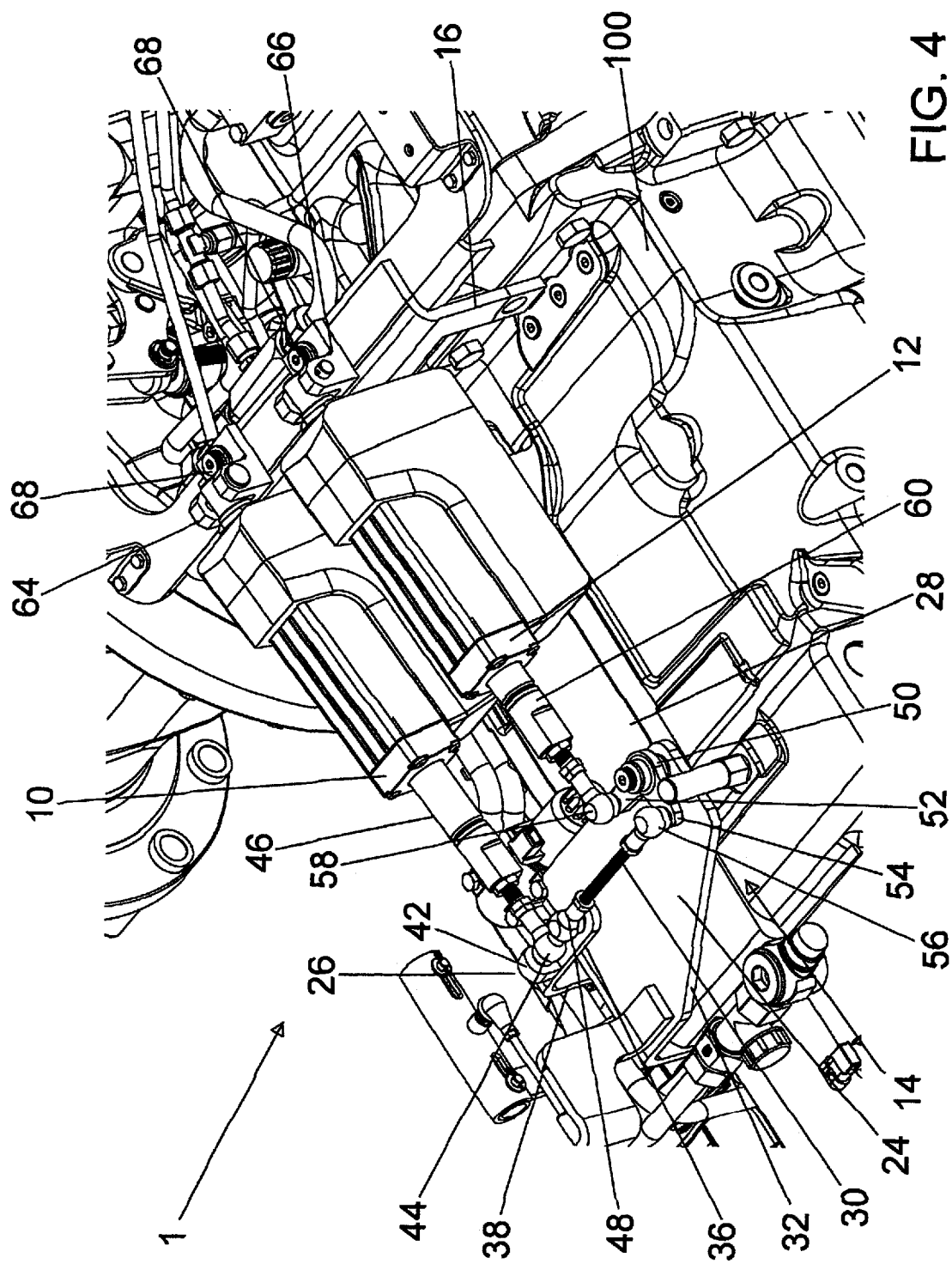
FIG. 4 is a right side perspective view of an electro-mechanical shifter retained on a heavy equipment transmission in accordance with the present invention.

With reference now to the drawings, and particularly to FIG. 1, there is shown a top perspective view of an electro-mechanical shifter 1. With reference to FIGS. 2-5, the electro-mechanical shifter preferably includes a first actuator 10, a second actuator 12, a shift linkage device 14, an actuator mounting bracket 16, a programmable controller 18 and a gear selector remote 20. The first and second actuators 10, 12 are preferably electrically operated linear actuators, but other types of actuators may also be used. The shift linkage device 14 includes a mounting base plate 24, a first transmission shifting bracket 26, a second transmission shifting bracket 28 and a linkage rod 30. The mounting base plate 24 includes a top member 32 and a side member 34 that extends downward from an end of the top member 32. The side member 34 is attached to a transmission housing 100, adjacent a gear shift output shaft. The first transmission shifting bracket 26 includes a top shift member 36 and a side shift member 38. The side shift member 38 extends downward from the top shift member 36. A shaft boss 40 extends inward from the side shift member 38. A shaft opening is formed through the shaft boss 40 to receive the gear shift output shaft. The shaft boss 40 is preferably secured to the gear shift output shaft with an suitable fastener. A shift plate 42 extends upward from one end of the top member 36.

A male member of a first spherical rod end 44 is threaded into the shift plate 42. A female member of the first spherical rod end 44 is secured to a first actuation rod 46 of the first actuator 10. A male member of a second spherical rod end 48 is secured to an opposing end of the top shift member 36. A female member of the second spherical rod end 48 is threaded on to one end of the linkage rod 30. The second transmission shifting bracket 28 includes a base 50, an actuator leg 52 and a linkage leg 54. The actuator leg 52 extends outward from the base 50 and the linkage leg 54 extends outward from the base 50, substantially perpendicular to the actuator leg 52. A male member of a third spherical rod end 56 is threaded into the linkage leg 54. A female member of the second spherical rod end 48 is threaded on to one end of the linkage rod 30 and a female member of the third spherical rod end 56 is threaded on to an opposing end of the linkage rod 30. A male member of a fourth spherical rod end 58 is threaded into the actuator leg 52 of the second transmission shifting bracket 28. A female member of the fourth spherical rod end 58 is secured to an actuation end 60 of the second actuator 12.

The actuator mounting bracket 16 is preferably attached to the transmission housing 100 with a pair of side mounting plates 62. Opposing ends of the actuator mounting bracket 16 are secured to inner surfaces of the pair of side mounting plates 62. A first mounting end of the first actuator 10 is pivotally mounted to the actuator mounting bracket 16 with a first clevis block 64. A mounting end of the second actuator 12 is pivotally mounted to the actuator mounting bracket with a second clevis block 66. The first and second clevis blocks 64, 66 pivot in a horizontal plane relative to the actuator mounting bracket 16 through shoulder screws 68.

Figure 5:
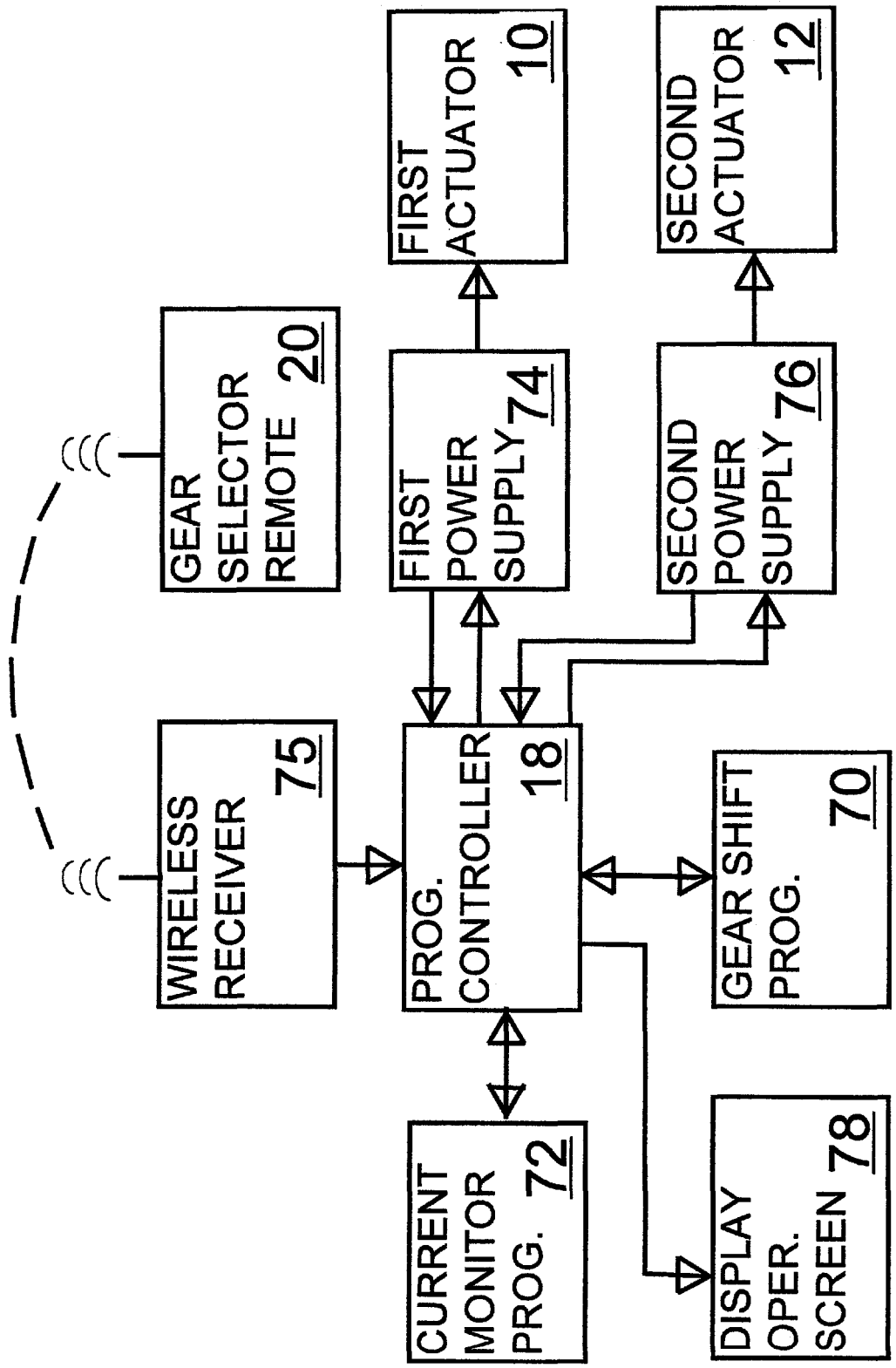
FIG. 5 is an electrical schematic of the electro-mechanical shifter in accordance with the present invention.

With reference to FIG. 5, the programmable controller 18 includes a gear shift program 70 and a current monitoring program 72. The programmable controller 18 receives input from the gear selector remote 20 through a wireless receiver 75. The gear shift program 70 sends an electrical signal to a first power supply 74 and a second power supply 76 to power the first and second actuators 10, 12, respectively. The first and second actuators 10, 12 move the first and second transmission shifting brackets 26, 28 to move the transmission into the gear selected on the gear selector remote 20. The current monitor program 72 monitors the amount of electrical current required to cause the first and second actuators 10, 12 to move the first and second transmission shifting brackets 26, 28. If the current exceeds pre-determined limits, the programmable controller 18 will send an alert to a display operating screen 78 of the heavy equipment. If too much or too little current is required to operate the first and second actuators 10, 12, there could be a problem with gears in the transmission or in the shift linkage device 14.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An electro-mechanical transmission shifter, comprising:
    a first actuator having a first rod end and a first mounting end;
    a second actuator having a second rod end and a second mounting end;
    a first transmission shifting bracket is retained on a gear shift output shaft of a transmission, said first rod end is spherically mounted to said first transmission shifting bracket;
    a second transmission shifting bracket pivots relative to the transmission, said second rod end is spherically mounted to said second transmission shifting bracket; and
    a programmable controller is capable of receiving a gear selection for the transmission, wherein said programmable controller supplies electrical power to said first and second actuators according to the gear selected by a user.

2. The electro-mechanical transmission shifter of claim 1 wherein:
    said first transmission shifting bracket includes a top shift member and a side shift member, said side shift member extends downward from an end of said top shift member, a shaft boss extends inward from said side shift member, a shaft bore is formed through said shaft boss to receive the gear shift output shaft.

3. The electro-mechanical transmission shifter of claim 1 wherein:
    said second transmission shifting bracket includes a base, an actuator leg and a linkage leg, said actuator leg extends outward from said base, said linkage leg extends outward from said base, substantially perpendicular to said actuator leg.

4. The electro-mechanical transmission shifter of claim 1, further comprising:
    a linkage rod having a first end spherically retained on said first transmission shifting bracket, a second end of said linkage rod is spherically retained on said second transmission shifting bracket.

5. The electro-mechanical transmission shifter of claim 1, further comprising:
    a mounting base plate is attached to a housing of the transmission, said second transmission shifting bracket is pivotally retained on said mounting base plate.

6. The electro-mechanical transmission shifter of claim 1, further comprising:
    an actuator mounting bracket is attached to a housing of the transmission, a first mount end of said first actuator is coupled to said actuator mounting bracket, a second mount end of said second actuator is coupled to said actuator mounting bracket.

7. The electro-mechanical transmission shifter of claim 6, further comprising:
    a first clevis block is pivotally engaged with said actuator mounting bracket, said first mount end is pivotally engaged with said first clevis block, a second clevis block is pivotally engaged with said actuator mounting bracket, said second mount end is pivotally engaged with said second clevis block.

8. An electro-mechanical transmission shifter, comprising:
- a first actuator having a first rod end and a first mounting end;
- a second actuator having a second rod end and a second mounting end;
- a first transmission shifting bracket is retained on a gear shift output shaft of a transmission, said first rod end is spherically mounted to said first transmission shifting bracket;
- a second transmission shifting bracket pivots relative to the transmission, said second rod end is spherically mounted to said second transmission shifting bracket, said first transmission shifting bracket is coupled to said second transmission shifting bracket; and
- a programmable controller is capable of receiving a gear selection for the transmission, wherein said programmable controller supplies electrical power to said first and second actuators according to the gear selected by a user.

9. The electro-mechanical transmission shifter of claim 8 wherein:
said first transmission shifting bracket includes a top shift member and a side shift member, said side shift member extends downward from an end of said top shift member, a shaft boss extends outward from said side shift member, a shaft bore is formed through said shaft boss to receive the gear shift output shaft.

10. The electro-mechanical transmission shifter of claim 8 wherein:
said second transmission shifting bracket includes a base, an actuator leg and a linkage leg, said actuator leg extends inward from said base, said linkage leg extends outward from said base, substantially perpendicular to said actuator leg.

11. The electro-mechanical transmission shifter of claim 8, further comprising:
a linkage rod having a first end spherically retained on said first transmission shifting bracket, a second end of said linkage rod is spherically retained on said second transmission shifting bracket.

12. The electro-mechanical transmission shifter of claim 8, further comprising:
a mounting base plate is attached to a housing of the transmission, said second transmission shifting bracket is pivotally retained on said mounting base plate.

13. The electro-mechanical transmission shifter of claim 8, further comprising:
an actuator mounting bracket is attached to a housing of the transmission, a first mount end of said first actuator is coupled to said actuator mounting bracket, a second mount end of said second actuator is coupled to said actuator mounting bracket.

14. The electro-mechanical transmission shifter of claim 13, further comprising:
a first clevis block is pivotally engaged with said actuator mounting bracket, said first mount end is pivotally engaged with said first clevis block, a second clevis block is pivotally engaged with said actuator mounting bracket, said second mount end is pivotally engaged with said second clevis block.

15. An electro-mechanical transmission shifter, comprising:
- a first actuator having a first rod end and a first mounting end;
- a second actuator having a second rod end and a second mounting end;
- a first transmission shifting bracket is retained on a gear shift output shaft of a transmission, said first rod end is spherically mounted to said first transmission shifting bracket;
- a second transmission shifting bracket pivots relative to the transmission, said second rod end is spherically mounted to said second transmission shifting bracket, said first transmission shifting bracket is coupled to said second transmission shifting bracket;
- a programmable controller is capable of receiving a gear selection for the transmission, wherein said programmable controller supplies electrical power to said first and second actuators according to the gear selected by a user; and
- a gear selector remote for wirelessly communicating with said programmable controller.

16. The electro-mechanical transmission shifter of claim 15 wherein:
said first transmission shifting bracket includes a top shift member and a side shift member, said side shift member extends downward from an end of said top shift member, a shaft boss extends inward from said side shift member, a shaft bore is formed through said shaft boss to receive the gear shift output shaft.

17. The electro-mechanical transmission shifter of claim 15 wherein:
said second transmission shifting bracket includes a base, an actuator leg and a linkage leg, said actuator leg extends outward from said base, said linkage leg extends outward from said base, substantially perpendicular to said actuator leg.

18. The electro-mechanical transmission shifter of claim 15, further comprising:
a linkage rod having a first end spherically retained on said first transmission shifting bracket, a second end of said linkage rod is spherically retained on said second transmission shifting bracket.

19. The electro-mechanical transmission shifter of claim 15, further comprising:
a mounting base plate is attached to a housing of the transmission, said second transmission shifting bracket is pivotally retained on said mounting base plate.

20. The electro-mechanical transmission shifter of claim 15, further comprising:
a first clevis block is pivotally engaged with said actuator mounting bracket, said first mount end is pivotally engaged with said first clevis block, a second clevis block is pivotally engaged with said actuator mounting bracket, said second mount end is pivotally engaged with said second clevis block.

* * * * *